Patented May 28, 1929.

1,714,636

UNITED STATES PATENT OFFICE.

URT SCHUMANN, EDUARD MÜNCH, OTTO SCHLICHTING, AND BRUNO CHRIST, OF LUDWIGSHAFEN-ON-THE-RHINE, GERMANY, ASSIGNORS TO GRASSELLI DYESTUFF CORPORATION, OF NEW YORK, N. Y., A CORPORATION OF DELAWARE.

PRODUCTION OF FORMALDEHYDE SULPHOXYLATES.

No Drawing. Application filed April 9, 1928, Serial No. 268,792, and in Germany April 22, 1927.

This invention relates to the production of formaldehyde sulphoxylate.

The production of aldehyde sulphoxylates has hitherto been effected by reducing aldehyde bisulphites with metals, with or without the addition of acids, and also by electrolytic reduction.

We have now found that formaldehyde sulphoxylate can be prepared from formaldehyde bisulphite in a simple manner and with a good yield by the reduction of the latter with hydrogen or a gas containing or supplying hydrogen, these gases being hereinafter referred to as reducing gases, in the presence of hydrogenating catalysts under energetic conditions.

Particularly suitable catalysts are the metals of the group 8 of the periodic system, and especially nickel and cobalt, and also platinum and the like. They may be used alone or on carriers, in the presence or absence of other metals or activators, such as copper, zinc, silver, tungsten, molybdenum, chromium or compounds thereof, or oxids or sulphids of metals of various other groups. The reduction may also be carried out in the presence of inert gases, and preferably in aqueous solutions of the formaldehyde bisulphite. Salts such as sodium sulphate or calcium chlorid, or organic substances such as alcohol, may also be present if desired.

The catalysts generally retain their activity for a considerable period, although, in many instances, they soon become laden with sulphur. After separation from the reaction liquid, the spent catalysts may be regenerated in a simple manner by treatment with hydrogen at an elevated temperature.

Catalysts which display special activity in connection with other catalytic reductions are preferably subjected, prior to use, to a supplementary treatment with the object of suppressing, to a sufficient degree, their capacity for producing secondary reactions, and of ensuring a prolongation of the activity of these catalysts. This can be effected in various ways, for example by an admixture of enfeebled or regenerated catalysts followed if necessary by heating or by treating the catalysts, prepared in the usual way, with suitable gases, for example carbon dioxid, containing, when required, small amounts of steam, or oxygen at elevated temperatures.

The process according to the present invention may be carried on at ordinary or raised temperatures, for example at 60° C. or over. The reduction already takes place under ordinary pressure, when activated catalysts are employed, but is substantially facilitated by the application of high pressure, which also accelerates the reaction. For example the other conditions being equal, the yield of formaldehyde sulphoxylate obtained with a working pressure of 50 atmospheres is 10 times as great as under ordinary pressure whilst with a pressure of 150 atmospheres the yield is increased about 15 to 20 fold. With pressures of 300 to 400 atmospheres, quantitative yields are obtained in a rather short time. When non-activated catalysts are employed, a working pressure of at least 20 atmospheres is necessary. The yields may also be considerably improved by a suitable choice of the catalyst and of the working temperature employed. In short, the reduction of formaldehyde bisulphite must be carried out under energetic conditions.

The hydrosulphite compounds of formaldehyde may also serve as initial materials in the process of the present invention such as are obtained, for example, by the action of formaldehyde on hydrosulphite, and the product thus obtained may be reduced to formaldehyde sulphoxylate as hereinbefore described. The said hydrosulphite compounds are also understood to be comprised in the expression "formaldehyde bisulphites".

The following examples will further illustrate the nature of the invention but the invention is not restricted to the examples. The parts are by weight.

*Example 1.*

40 parts of a 10 per cent aqueous solution of formaldehyde bisulphite and 2 parts of a nickel catalyst, containing about 25 per cent of nickel, deposited on kieselguhr and prepared in the usual manner at 420° C., are agitated for 30 hours at from 20° to 25° C. and for 8 hours at 50° C., with hydrogen under a pressure of 40 atmospheres.

If the nickel catalyst be replaced by a nickel-cobalt or nickel-chromium catalyst, a powerful reducing action is also obtained. The reduction can also be carried out in a 50 per cent alcohol solution, instead of in water, the operation being then preferably conducted at room temperature.

*Example 2.*

A mixture of 1000 parts of a 25 per cent solution of formaldehyde bisulphite and 125 parts of a 25 per cent nickel-kieselguhr catalyst is agitated for 40 hours at 50° C. in an autoclave, with hydrogen under a pressure of 150 atmospheres. After removal of the catalyst, a solution is obtained which contains a yield of formaldehyde sulphoxylate corresponding to 40 per cent of the theoretical yield calculated on the amount of formaldehyde bisulphite taken. The yield can be considerably increased by employing a higher hydrogen pressure.

If the catalyst which has been separated off and which contains about 2 per cent of sulphur, be reduced with hydrogen at from 400 to 450° C., it will furnish approximately the same yields of formaldehyde sulphoxylate as before, under the same working conditions.

*Example 3.*

Nickel carbonate preciptated on levigated kieselguhr is treated with pure hydrogen for 1 hour at from 400° to 450° C., and then with carbon dioxid, containing water vapor at 250° C.

20 parts of the resulting catalyst, containing about 25 per cent of nickel, are suspended in 250 parts of an 8 per cent solution of sodium-formaldehyde bisulphite, the mixture being then agitated at 50° C. for 70 hours with hydrogen under a pressure of 120 atmospheres. After removing the catalyst, a solution is obtained which, in addition to undecomposed formaldehyde bisulphite, contains a yield of formaldehyde sulphoxylate exceeding 50 per cent of the theoretical. After the solution has been treated with rather more than the calculated amount of caustic soda solution and concentrated in vacuo, the formaldehyde sulphoxylate may be recovered by extracting the residue with alcohol.

When a solution of zinc-formaldehyde bisulphite is employed, the resulting solution of zinc-formaldehyde sulphoxylate and of zinc-formaldehyde bisulphite may be converted, by treatment with zinc dust in any known and suitable manner, into the sparingly soluble dizinc-formaldehyde sulphoxylate and this into sodium-formaldehyde sulphoxylate by decomposition with caustic soda solution.

*Example 4.*

20 parts of formaldehyde bisulphite are dissolved in 200 parts of water and 20 parts of a catalyst comprising nickel deposited on kieselguhr and activated by tungsten are added thereto. 100 parts of the catalyst contain about 20 parts of nickel and 5 parts of lower tungsten oxids. The reaction mixture is then agitated for 40 hours at a temperature of 50 to 55° C. under a pressure of 140 atmospheres of hydrogen. After the product is worked up in the usual manner formaldehyde sulphoxylate is obtained in a yield of 57 per cent of the theoretical.

In place of a nickel tungsten kieselguhr catalyst a nickel-chromium-tungsten or a nickel-copper tungsten or a nickel-lead-vanadium catalyst may be employed.

What we claim is:—

1. A process for the production of formaldehyde sulphoxylate which consists in reducing formaldehyde bisulphites with a reducing gas in the presence of a hydrogenating catalyst, under energetic conditions.

2. A process for the production of formaldehyde sulphoxylate, which consists in reducing formaldehyde bisulphites with a reducing gas in the presence of a hydrogenating catalyst under a pressure of at least 20 atmospheres.

3. A process for the production of formaldehyde sulphoxylate, which consists in reducing formaldehyde bisulphites with a reducing gas in the presence of an activated hydrogenating catalyst.

4. A process for the production of formaldehyde sulphoxylate, which consists in reducing formaldehyde bisulphites with a reducing gas in the presence of a hydrogenating catalyst activated by an admixture selected from the group consisting of copper, zinc, silver, tungsten, molybdenum and chromium, and compounds thereof.

5. A process for the production of formaldehyde sulphoxylate, which consists in reducing formaldehyde bisulphites with a reducing gas in the presence of a hydrogenating catalyst comprising a metal of the group 8 of the periodic system at a pressure of at least 20 atmospheres.

6. A process for the production of formaldehyde sulphoxylate, which consists in reducing formaldehyde bisulphites with a reducing gas in the presence of a hydrogenating catalyst activated by an admixture selected from the group consisting of copper, zinc, silver, tungsten, molybdenum and chromium, and compounds thereof, on a carrier.

7. A process for the production of formaldehyde sulphoxylate, which consists in reducing formaldehyde bisulphites with hydrogen at a pressure of at least 20 atmospheres in the presence of nickel deposited on kieselguhr.

8. A process for the production of formaldehyde sulphoxylate, which consists in reducing formaldehyde bisulphites with hydrogen at a pressure of at least 20 atmospheres in the presence of nickel activated by vanadium and deposited on kieselguhr.

In testimony whereof we have hereunto set our hands.

CURT SCHUMANN.
EDUARD MÜNCH.
OTTO SCHLICHTING.
BRUNO CHRIST.